(12) United States Patent
Lee et al.

(10) Patent No.: US 8,467,834 B2
(45) Date of Patent: Jun. 18, 2013

(54) WINDOW FOR MOBILE TERMINAL AND MOBILE TERMINAL HAVING THE SAME

(75) Inventors: Su-Hyun Lee, Seoul (KR); Seong-Cheol Lee, Seoul (KR); Han-Gyu Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 12/566,379

(22) Filed: Sep. 24, 2009

(65) Prior Publication Data

US 2010/0075720 A1  Mar. 25, 2010

(30) Foreign Application Priority Data

Sep. 25, 2008  (KR) .................. 10-2008-0094361

(51) Int. Cl.
*H04B 1/38* (2006.01)

(52) U.S. Cl.
USPC ........... 455/566; 345/173; 345/174; 345/175; 455/550.1; 455/575.1; 455/575.3; 455/575.4

(58) Field of Classification Search
None
See application file for complete search history.

(56) References Cited

U.S. PATENT DOCUMENTS

| 2004/0095334 A1* | 5/2004 | Hong ........................... 345/173 |
| 2007/0030275 A1 | 2/2007 | Kim |
| 2008/0174565 A1* | 7/2008 | Chang et al. .................. 345/173 |
| 2008/0218487 A1* | 9/2008 | Huang et al. .................. 345/173 |
| 2008/0231743 A1* | 9/2008 | Tseng ........................... 348/360 |
| 2008/0242377 A1* | 10/2008 | Lee ............................ 455/575.1 |
| 2008/0246744 A1* | 10/2008 | Park et al. .................... 345/173 |
| 2008/0284737 A1* | 11/2008 | Kim et al. .................... 345/168 |

* cited by examiner

*Primary Examiner* — Rafael Pérez-Gutiérrez
*Assistant Examiner* — Suhail Khan
(74) *Attorney, Agent, or Firm* — Lee, Hong, Degerman, Kang & Waimey (57) ABSTRACT

Disclosed is a mobile terminal including, a terminal body having a window mounting portion, a window mounted on the window mounting portion, and having a first region to implement a touch screen and a second region to input manipulation information, and a Flexible Printed Circuit Board (FPCB) configured to electrically connect the terminal body to the window, wherein the FPCB is connected at a position between the first region and the second region.

24 Claims, 7 Drawing Sheets

WINDOW FOR MOBILE TERMINAL AND MOBILE TERMINAL HAVING THE SAME

CROSS-REFERENCE TO RELATED APPLICATIONS

Pursuant to 35 U.S.C. 119(a), this application claims the benefit of earlier filing date and right of priority to Korean Patent Application No. 10-2008-0094361, filed on Sep. 25, 2008, the contents of which are hereby incorporated by reference herein in their entirety.

BACKGROUND OF THE INVENTION

1. Field of the Invention

The present invention relates to a window for a mobile terminal capable of reducing an installation space of a Flexible Printed Circuit Board (FPCB) connected to a touch screen, and a mobile terminal having the same.

2. Background of the Invention

Terminals can be divided into mobile/mobile terminals and stationary terminals according to their mobility. The mobile terminals may be divided into handheld terminals and vehicle mount terminals according to whether a user directly carries his terminal.

As it becomes multifunctional, the mobile terminal can be allowed to capture still images or moving images, play music or video files, play games, receive broadcast and the like, so as to be implemented as an integrated multimedia player.

In order to support and enhance such functions of the terminal, it may be considered to improve configuration and/or software of the terminal.

In recent time, for implementing a simple design of a mobile terminal and providing convenient user interfaces, a touch related technology, such as touch screen, touch pad, and the like is being applied to a mobile terminal,

SUMMARY OF THE INVENTION

An object of the present invention is to reduce an installation space of a Flexible Printed Circuit Board (FPCB) connected to a touch screen, so as to reduce a size or thickness of a terminal body or ensure an installation space for other components.

To achieve this and other advantages and in accordance with the purpose of the present invention, as embodied and broadly described herein, there is provided a mobile terminal including, a terminal body having a window mounting portion, a window mounted on the window mounting portion, and having a first region to implement a touch screen and a second region to input manipulation information, and a Flexible Printed Circuit Board (FPCB) configured to electrically connect the terminal body to the window, wherein the FPCB is connected at a position between the first region and the second region.

At least one portion of the FPCB may be disposed to overlap with the second region, and a manipulation unit for inputting manipulation information may be disposed at the second region of the window.

The manipulation unit may include a touch key operating in a touching manner, and the FPCB may be provided with a touch sensor for sensing the touch input via the touch key.

The manipulation unit may include a push key operating in a pressing manner, and the FPCB may be provided with a switch that inputs manipulation information in cooperation with the push key being pressed.

The FPCB may be provided with a processor for manipulation information input via the first region and the manipulation unit.

The mobile terminal may further include a connecting unit disposed between the first region and the second region for connecting the window to the FPCB.

In one aspect of the present invention, there is provided a window of a mobile terminal including, a base having a first region to implement a touch screen and a second region to input manipulation information, a touch sheet disposed on one surface of the base, and configured to sense a touch input on the first region, and a Flexible Printed Circuit Board (FPCB) configured to electrically connect a terminal body to the touch sheet, wherein the FPCB is connected at a position between the first region and the second region.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Figure 1:
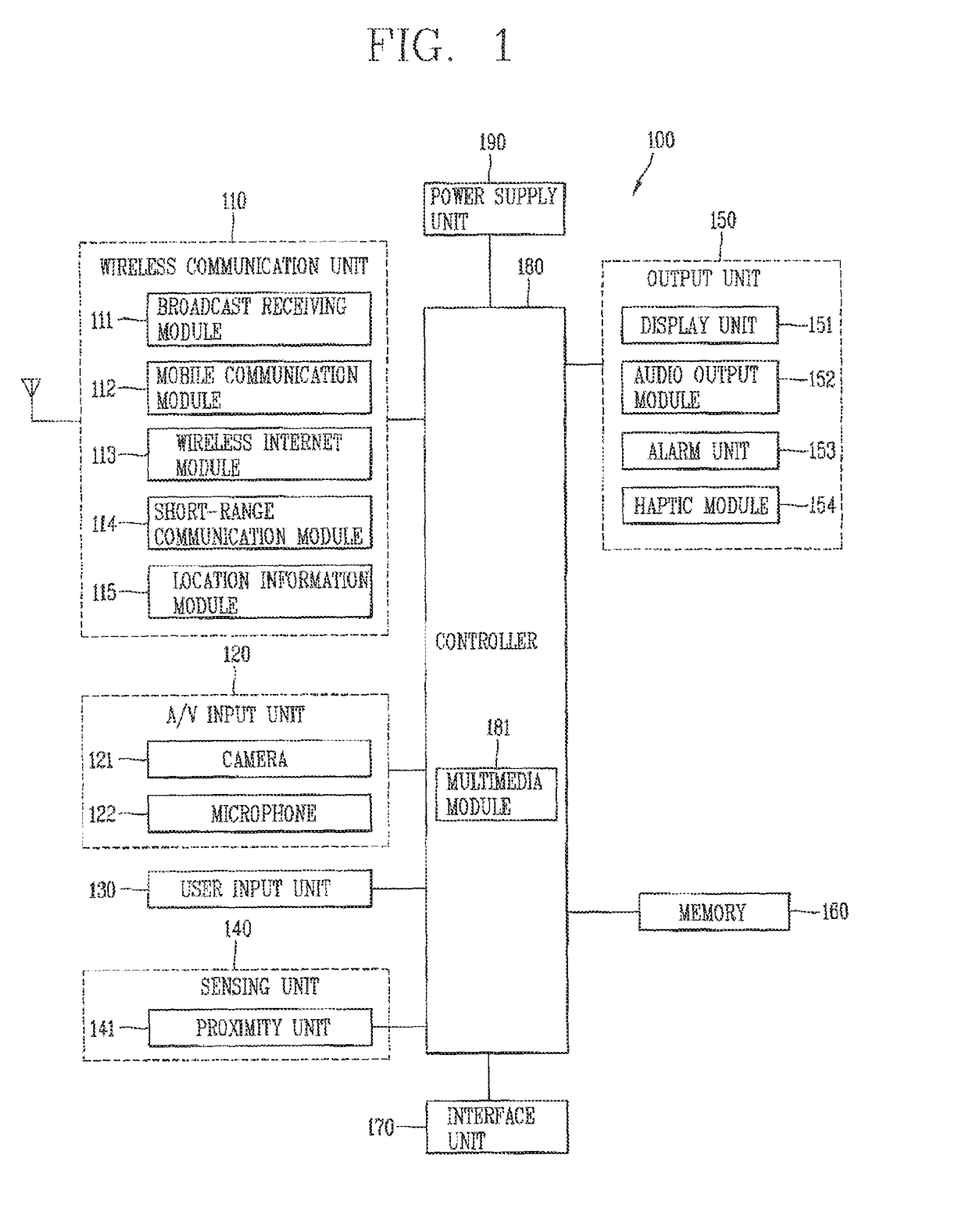
FIG. 1 is a block diagram of a mobile terminal in accordance with one exemplary embodiment of the present invention.

FIG. 1 is a block diagram of a mobile terminal in accordance with one exemplary embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device. The sensing unit 140 may include a proximity sensor 141.

The output unit 150 is configured to output an audio signal, a video signal or a tactile signal. The output unit 150 may include a display unit 151, an audio output module 152, an alarm 153, a haptic module 154, and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
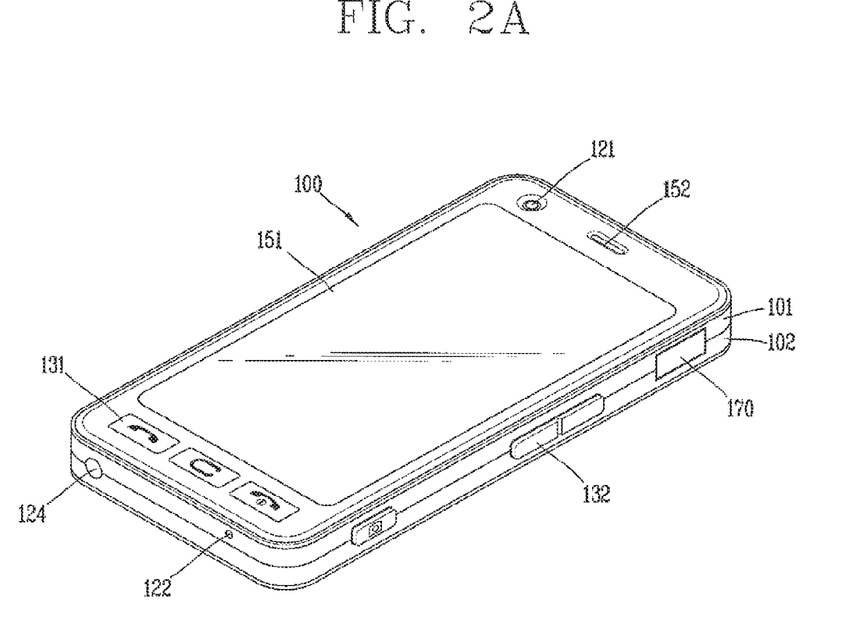
FIG. 2a is a front perspective view of a mobile terminal in accordance with one embodiment of the present invention.

FIG. 2a is a front perspective view of the mobile terminal in accordance with one embodiment of the present invention.

The mobile terminal 100 described is a bar type body. However, the present invention is not limited to the type, but applicable to various configurations having two or more bodies to each other to be relatively movable, such as a bar type, a folder type, a swing type, a swivel type and the like.

A case (casing, housing, cover, etc.) forming an outer appearance of a terminal body. In this embodiment, the case may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

The terminal body, in detail, the front case 101 is shown having a display unit 151, an audio output module 152, a camera 121, a user input unit 130 (e.g., 131 to 134), a microphone 122, an interface unit 170 and the like.

The display unit 151 may occupy most of a main surface of the front case 101. The audio output module 152 and the camera 121 are disposed at a region adjacent to one of both end portions of the display unit 151, and the user input unit 131 and the microphone 122 are disposed at a region adjacent to another end portion thereof. The user input unit 132, the interface unit 170 and the like may be disposed at side surfaces of the front case 101 and the rear case 102.

The user input unit 130 may be manipulated to receive a command input for controlling the operation of the portable terminal 100, and include the first and second manipulation units 131 and 132. The first and second manipulation units 131 and 132 may be referred to as a manipulating portion. The manipulating portion may be operated by a user in any tactile manner.

Contents input by the first and second manipulation units 131 and 132 may variously be set. For example, the first manipulation unit 131 may be configured to input commands such as START, END, SCROLL or the like, and the second manipulation unit 132 may be configured to input a command, such as adjusting an audio sound, a conversion of the display unit 151 into a touch-sensitive mode or the like.

Figure 2B:
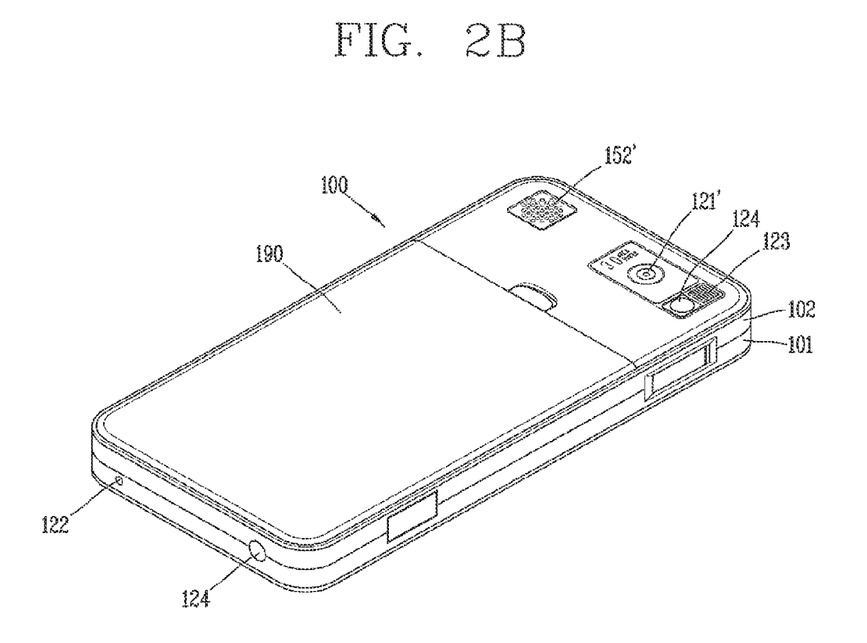
FIG. 2b is a rear perspective view of the mobile terminal in accordance with the one embodiment of the present invention.

FIG. 2b is a rear perspective view of the mobile terminal shown in FIG. 2a.

As shown in FIG. 2b, a rear surface of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body. The audio output module 152' can cooperate with the audio output module 152 (see FIG. 2a) to provide stereo output. Also, the audio output module 152' may be configured to operate as a speakerphone.

A broadcast signal receiving antenna 124 may further be disposed at the side surface of the terminal body in addition to an antenna for communications. The antenna 124 configuring a part of the broadcast receiving module 111 (see FIG. 1) may be retractable into the terminal body.

A power supply unit 190 for supplying power to the mobile terminal 100 may be mounted to the terminal body. The power supply 190 may be internally disposed at the terminal body, or be detachably disposed outside the terminal body.

Figure 3:
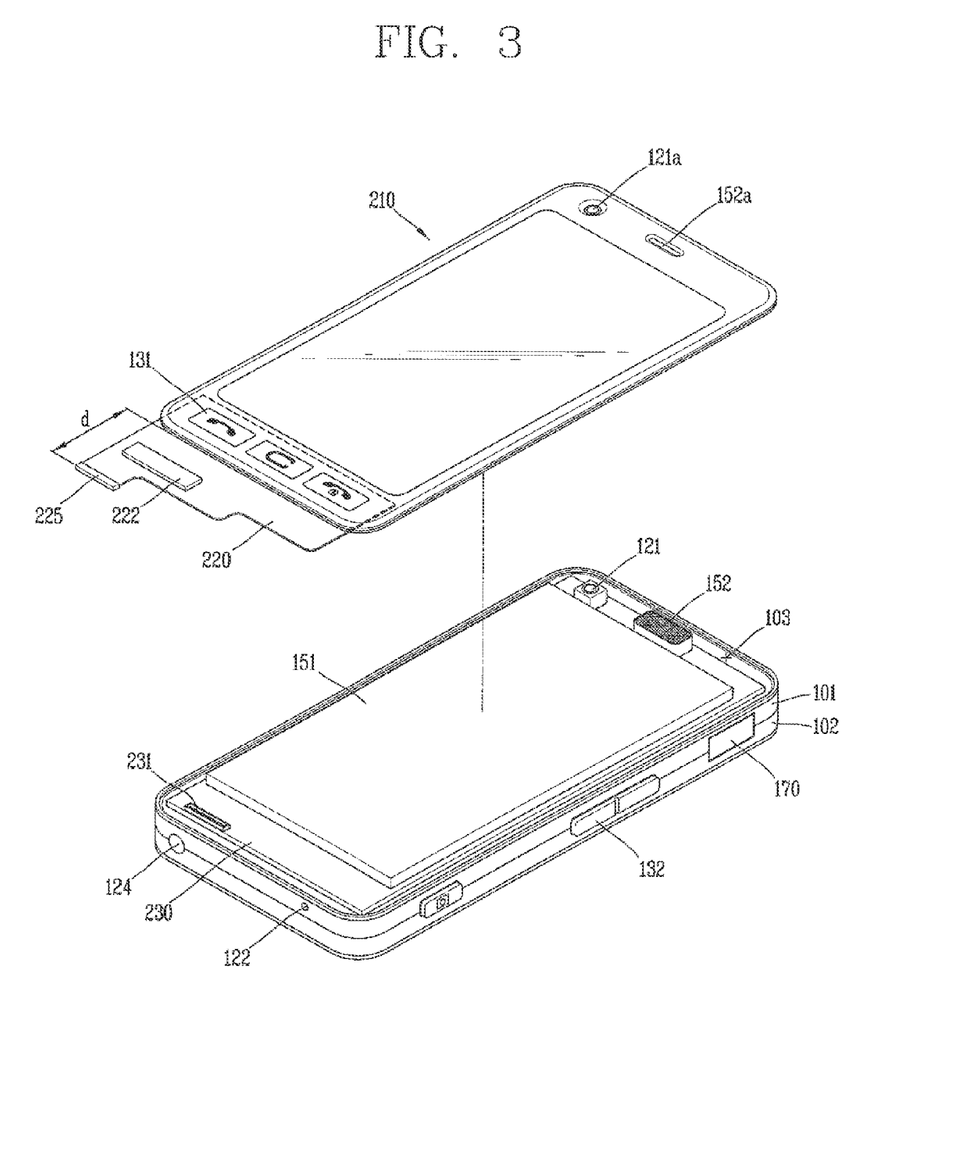
FIG. 3 is a disassembled view of the mobile terminal in accordance with the one embodiment of the present invention.

FIG. 3 is a disassembled view of the mobile terminal in accordance with the one embodiment of the present invention.

As shown in FIG. 3, a window mounting portion 103 may be formed in the front case 101. A window 210 may be mounted in the window mounting portion 103. The window 210 may be formed in a plate-like shape so as to be aligned within the window mounting portion 103.

Figure 4:
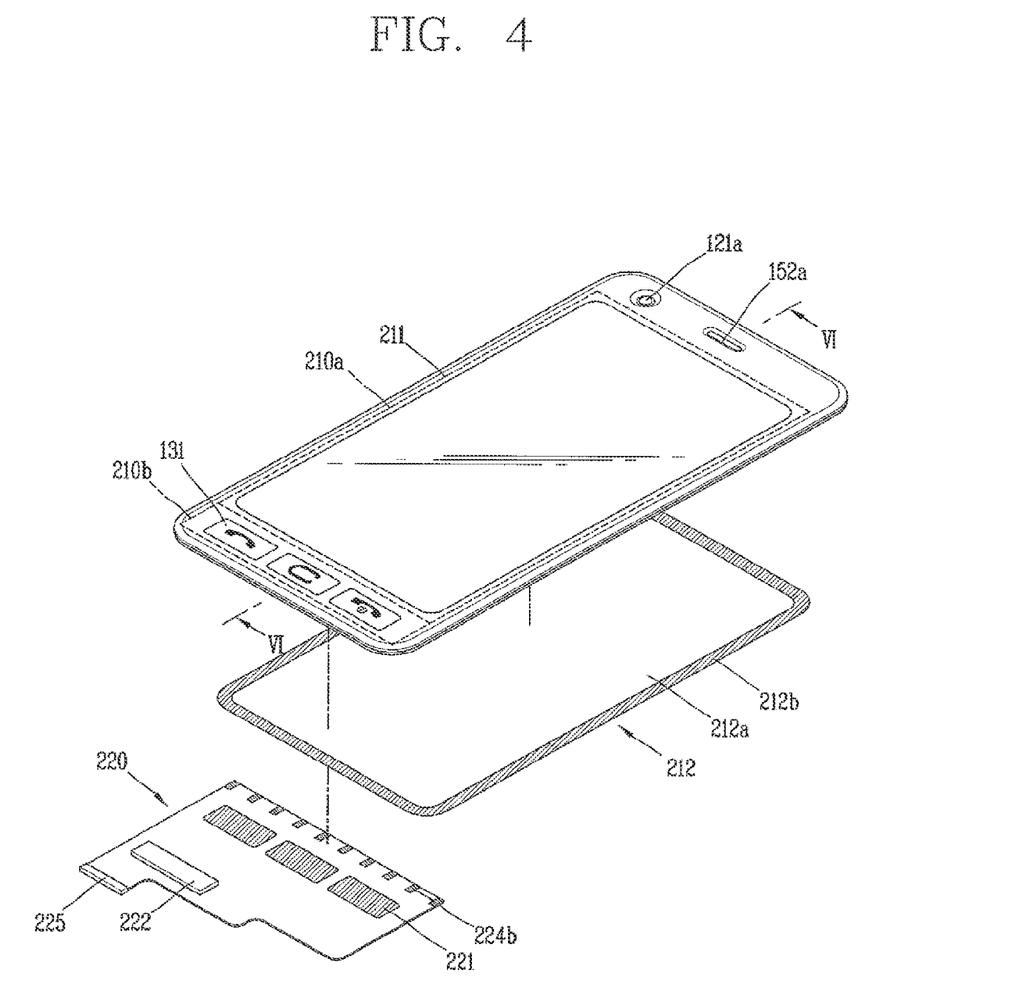
FIG. 4 is a disassembled view of the window shown in FIG. 3.

The window 210 may include a first region 210a implementing a touch screen, and a second region 210b providing a space for inputting manipulation information (see FIG. 4).

The first region 210a may be transparently formed such that visual information output from a display module 151 can be transmitted therethrough, and the rest region excluding the first region 210a may be opaquely formed so as to shield components within the terminal body.

The second region 210b may be formed at one side of the first region 210a to have a specific space. The first manipulation unit 131 for inputting manipulation information may be disposed at the second region 210b. The first manipulation unit 131 according to this embodiment may be implemented as touch keys touched for inputting information. The touch keys 131 may be formed by being printed or carved on the window 210.

A flexible printed circuit board (FPCB) 220 for electrically connecting the window 210 to the terminal body may be disposed on a rear surface of the window 210. The FPCB 220 may be formed of a flexible material, and have circuit patterns on its one surface.

The FPCB 220 may be connected to the window 210 between the first region 210a and the second region 210b, and at least one portion of the FPCB 220 may overlap with the second region 210b.

A printed circuit board 230 may be mounted in the terminal body. A plurality of electric components for operating functions of the mobile terminal may be mounted on the printed circuit board 230.

The display module 151 for outputting visual information on the first region 210a of the window 210 may be mounted on the printed circuit board 230. The audio output module 152, the camera 121, a connector 231 and the like may be installed at a periphery of the display module 151.

One end of the FPCB 220 is connected to the window 210 and another end thereof is connected to the connector 231 disposed on the printed circuit board 230. Accordingly, information relating to a touch input via the first region 210a of the window 210 and the touch key 131 may be sent to the printed circuit board 230 via the FPCB 220.

Figure 5:
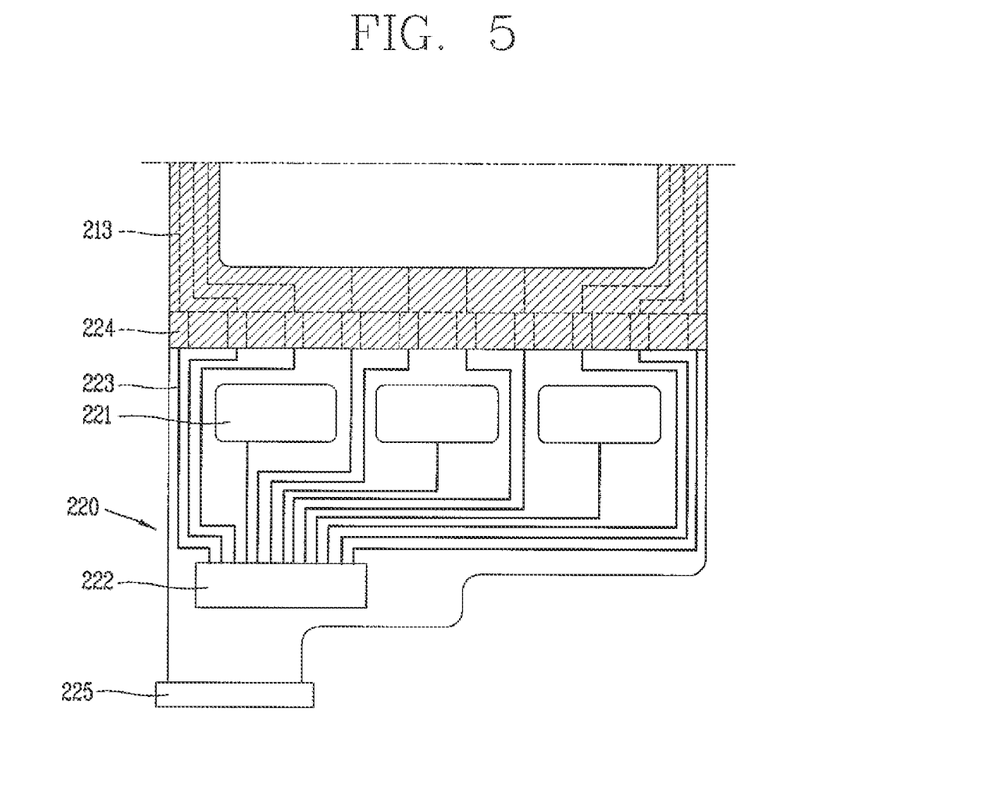
FIG. 5 is a plane view showing a touch sheet and a Flexible Printed Circuit Board (FPCB) of FIG. 4.
Figure 6:
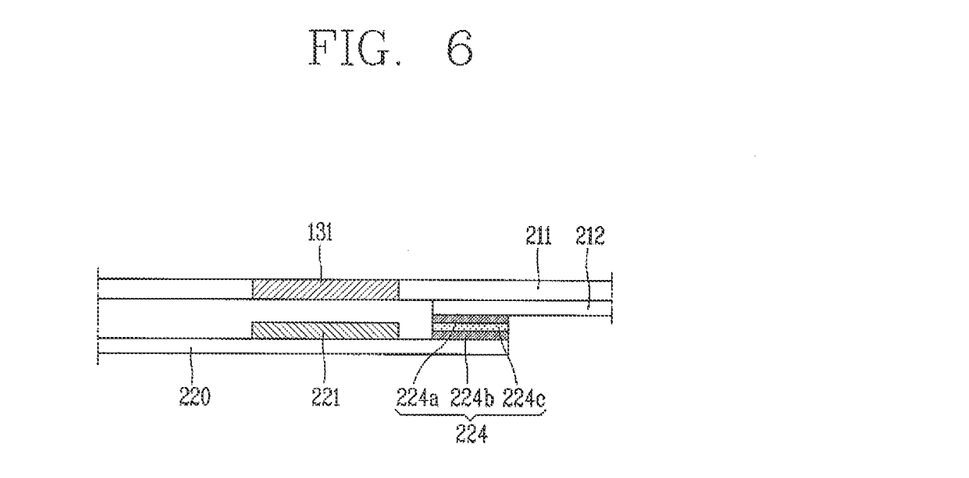
FIG. 6 is a cross-sectional view of the window taken along the line VI-VI of FIG. 4.

FIG. 4 is a disassembled view of the window shown in FIG. 3, FIG. 5 is a plane view showing a touch sheet and the Flexible Printed Circuit Board (FPCB) of FIG. 4, and FIG. 6 is a cross-sectional view of the window taken along the line VI-VI of FIG. 4.

As shown in FIG. 4, the window 210 may include a base 211 configuring an outer appearance of the window 210, and a touch sheet 212 disposed on one surface of the base 211.

The base 211 may be formed of a transparent synthetic resin. A non-transparent printing layer defining the first region 210a may be formed at a rear surface of the base 211.

The touch sheet 212 may be attached onto the rear surface of the base 211, and configured to detect a touch input applied onto the first region 210a. The touch sheet 212 may have a shape and a size both corresponding to those of the first region 210a of the window 210, and be attached onto the first region 210a of the base 211.

Conductive patterns formed of a conductive material may be provided on a central region 212a of the touch sheet 212. The conductive patterns may be formed by sputtering a transparent conductive material, such as indium tin oxide (ITO), on the touch sheet 212 having a non-conductivity.

The conductive patterns may be formed as a plurality of lines with a uniform pattern. The touch sheet 212 may be formed as a single layer or in a manner of a plurality of layers being stacked together.

Referring to FIG. 5, connection lines 213 connected to the conductive patterns may be disposed on an edge region 212b of the touch sheet 212. The connection lines 212b may be patterned on the touch sheet 212 in a sputtering manner or the like. The connection lines 213 may extend towards a lower end of the touch sheet 212 so as to be connected to the FPCB 220.

The FPCB 220 may be connected to the window 210 by a connecting unit 224 between the first region 210a and the second region 210b. One end of the connecting unit 224 may be connected to the connection lines 213, and another end thereof may be connected to wires 223 of the FPCB 220.

Touch sensors 221 for detecting a touch input applied onto the touch keys 131 may be disposed on one surface of the FPCB 220. Each of the touch sensors 221 may be printed on the FPCB 220 or be formed by being sputtered on the FPCB 220. The touch sensors 221 may be formed in plurality at positions corresponding to the positions of the touch keys 131.

A processor 222 for processing information relating to a touch input via the first region 210a and any of the touch keys 131 may be installed on the FPCB 220. The wires 223 of the FPCB 220 may be connected to the connection lines 213 of the touch sheet 212 and the touch sensors 221, respectively. The wires 223 of the FPCB 220 may also be connected to the processor 222. That is, the processor 222 may be electrically connected to the conductive patterns of the touch sheet 212 and the touch sensors 221, respectively.

When a touch input is detected on the first region 210a and accordingly a touch signal is generated on the conductive pattern or when a touch input is detected on any of the touch keys 131 and accordingly a touch signal is generated from the corresponding touch sensor 221, such touch signals may be applied to the processor 222. For instance, when the first region 210a is touched, a capacitance generated from the conductive pattern changes. Accordingly, the processor 222 processes the touch signals generated according to the change in the capacitance, thereby calculating a touched position, a touched time, and the like.

A connector 225 engaged with the connector 231 of the printed circuit board 230 may be installed at an end of the FPCB 220. Touch information processed by the processor 222 may be applied to the controller 180 of the printed circuit board 230 via the connector 225.

Referring to FIG. 6, the connecting unit 224 may include a first pad 224a formed on the touch sheet 212, a second pad 224b formed on the FPCB 220, and an adhesive film 224c for adhering the first pad 224a with the second pad 224b.

The first pad 224a and the second pad 224b may be connectable respectively to the connection lines 213 of the touch sheet 212 and the wires 223 of the FPCB 220. The first and second pads 224a and 224b may be made of a conductive material and formed on the touch sheet 212 and the FPCB 220, respectively, by being sputtered thereon.

The adhesive film 224c may be formed of an adhesive material with conductivity. Accordingly, the adhesive film 224c may serve to adhere the first pad 224a to the second pad 224b and simultaneously to conduct therebetween. Alternatively, the adhesive film 224c may be configured in a form of an-isotropic conductive film (ACF). The ACF is obtained by dispersing conductive particles onto adhesive components, which can be hardened, and then forming the resultants in the form of film. If such ACF is interposed between the first and second pads 224a and 224b and then the first and second pads 224a and 224b are pressed, a current flows due to the conductive particles in a Z direction but does not flow in X and Y directions, thereby connecting the circuits of the first and second pads 224a and 224b.

The mobile terminal having such configuration can reduce a space for disposing the FPCB 220 by disposing one end of the FPCB 220 at a position between the first region 210a and the second region 210b of the window 210. That is, a length of the FPCB 220 extending from the lower end of the window 210 can be reduced, thus to increase a space for installing components within the terminal body or decreasing thickness, size and the like of the terminal body.

Figure 7:
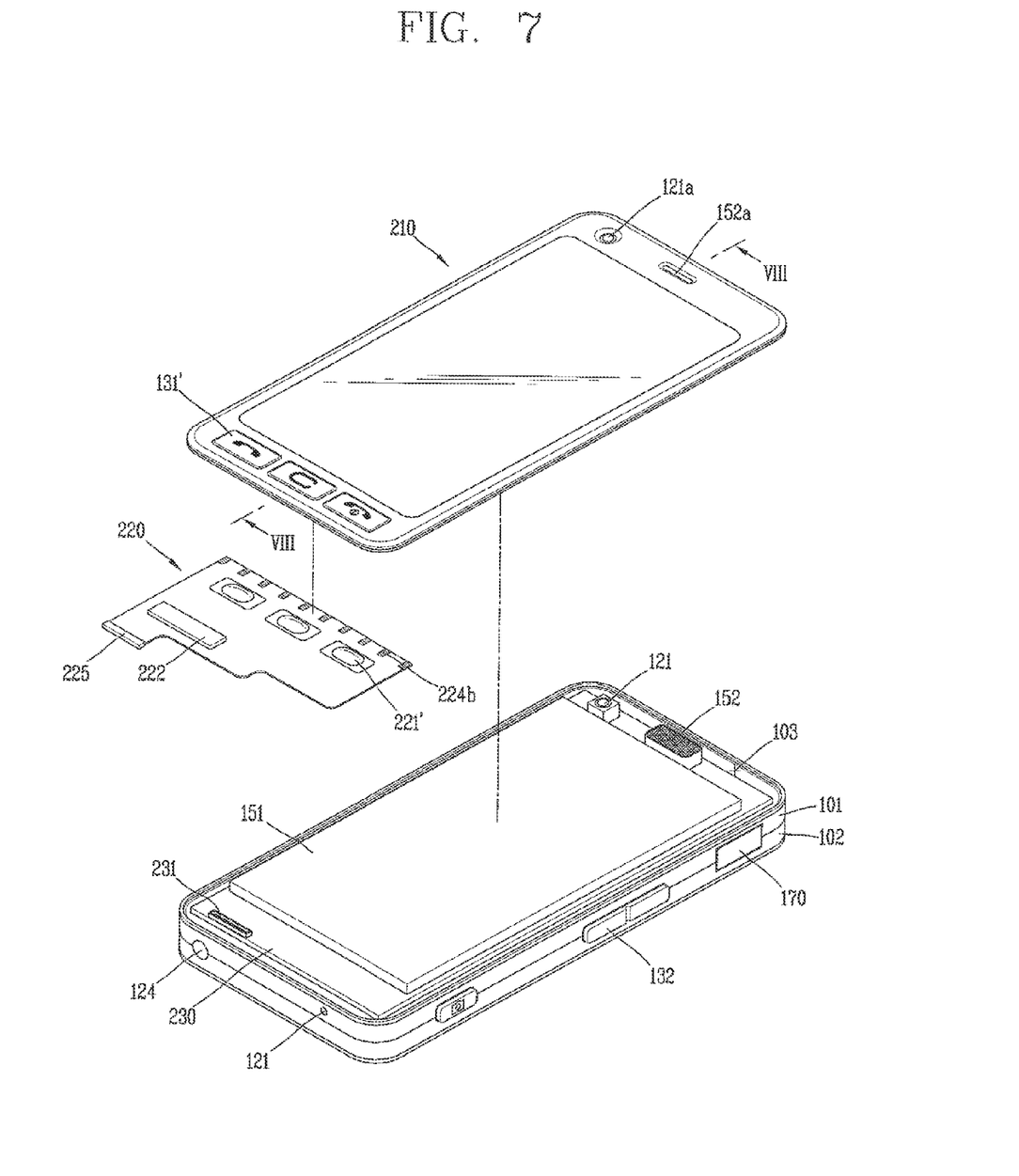
FIG. 7 is a disassembled view of a mobile terminal in accordance with another embodiment of the present invention.
Figure 8:
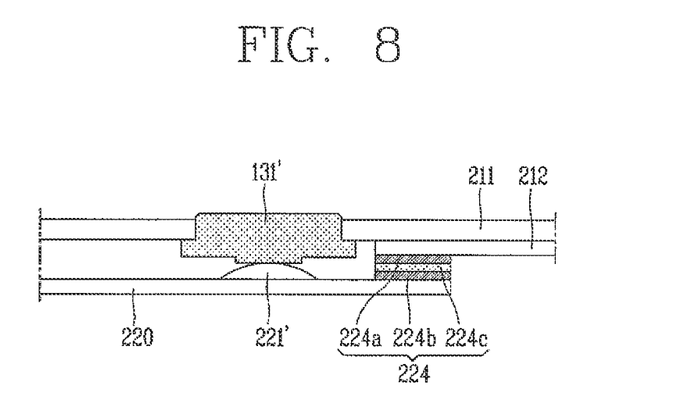
FIG. 8 is a cross-sectional view of a window taken along the line VII-VIII of FIG. 7.

FIG. 7 is a disassembled view of a mobile terminal in accordance with another embodiment of the present invention, and FIG. 8 is a cross-sectional view of a window taken along the line VII-VIII of FIG. 7.

As shown in FIGS. 7 and 8, a first manipulation unit 131' according to this embodiment may has a shape of a push key 131' operating in a pushing manner. This embodiment has the same configuration to the previous embodiment excluding the configuration related to the first manipulation unit 131', and thus the description of the same configuration will be omitted.

A switch 221' for inputting manipulation information in cooperation with the corresponding push key 131' being pressed may be mounted on the FPCB 220. A push protrusion for pushing the switch 221' may be formed on a rear surface of the corresponding push key 131', and the switch 221' pushed by the push protrusion may generate a manipulation signal.

Manipulation information input via the first region 210a of the window 210 and the push key 131' may be applied to the processor 222 to be then processed as similar to the previous embodiment.

As discussed so far, the present invention can effectively reduce an installation space of the FPCB by disposing the FPCB at a position between the first region and the second region of the window, thereby decreasing size and thickness of the terminal body and ensuring the installation space for electric components.

Further, in the present invention, the FPCB is disposed to overlap with the second region and touch sensors are disposed on the FPCB, so as to save a space required for installation and improve a touch sensitivity.

In addition, in the present invention, conductive patterns are formed on the touch sheet and touch sensors are disposed on the FPCB, resulting in minimizing the chance of noise occurrence between the conductive patterns and the touch sensors.

The aforesaid configuration and method for the mobile terminal is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body having a window mounting portion;
a display coupled to the terminal body and being configured to display information;
a window being configured to couple with the window mounting portion and at a location that is over the display, the window comprising a first region and a second region and a top side and a bottom side, wherein the first region comprises material that is shaped to generally correspond to a displayable area of the display such that the first region permits viewing of the displayed information of the display, and wherein the second region comprises an input area configured to receive user input via contact received at the top side of the window at an area that generally corresponds with the input area of the second region;
a touch sheet operatively coupled to the bottom side of the window and being positioned between the window and the display, wherein the touch sheet permits detection of a touch input in response to touch contact with the top side of the first region of the window;
a controller; and
a Flexible Printed Circuit Board (FPCB) comprising a connection portion and a sensor, wherein the connection portion is configured to electrically connect the controller with the touch sheet, and wherein the sensor is located to generally correspond to at least a portion of the second region of the window such that the sensor is configured to detect the user input via contact received at the top side of the window at the area that generally corresponds with the input area of the second region.

2. The mobile terminal of claim 1, wherein the second region of the window extends from the first region of the window.

3. The mobile terminal of claim 1, wherein at least a portion of the FPCB overlaps the second region of the window.

4. The mobile terminal of claim 1, wherein:
the touch sheet comprises connection lines and the FPCB comprises connection wires; and
the connection lines of the touch sheet are connected to the connection wires of the FPCB in the portion of the second region between the input area and the first region.

5. The mobile terminal of claim 1, wherein the connection portion comprises:
a first pad disposed on the touch sheet and connected to a conductive pattern formed on the window;

a second pad located on the FPCB and connected to an electric wire of the FPCB; and an adhesive film between the first and second pads and adhering the first pad to the second pad.

6. The mobile terminal of claim 5, wherein the adhesive film comprises an An-isotropic Conductive Film (ACF) applying an electric current in only one direction.

7. The mobile terminal of claim 1, wherein the input area of the second region comprises a plurality of discrete inputs; and wherein the sensor comprises a plurality of sensor inputs which respectively correspond with the plurality of discrete inputs.

8. The mobile terminal of claim 7, wherein each of the plurality of discrete inputs comprises a push key.

9. The mobile terminal of claim 7, wherein each of the plurality of discrete inputs comprises a mechanical push button.

10. The mobile terminal of claim 1, wherein the window is shaped to define a first aperture, wherein the first aperture is located to cooperate with an underlying speaker to facilitate audio transmission via the first aperture.

11. The mobile terminal of claim 1, wherein the window further comprises a third region which is located between the first region of the window and the second region of the window, and wherein the connection portion of the FPCB is generally located under the window and at a location that is within a boundary defined by the third region.

12. The mobile terminal of claim 1, wherein the connection portion and the sensor are located on a same side of the FPCB.

13. The mobile terminal of claim 1, further comprising a touch key located in the input area and adapted to receive a touch input from a user and wherein the FPCB comprises a touch sensor adapted to sense the touch input received via the touch key.

14. A mobile terminal interface comprising:

a window being configured to couple with a window mounting portion and at a location that is over a touchscreen display, the window comprising a first region and a second region and a top side and a bottom side, wherein the first region comprises material that is shaped to generally correspond to a displayable area of the display such that the first region permits viewing of the displayed information of the display, and wherein the second region comprises an input area configured to receive user input via contact received at the top side of the window at an area that generally corresponds with the input area of the second region;

a touch sheet operatively coupled to the bottom side of the window and being positioned between the window and the display, wherein the touch sheet permits detection of a touch input in response to touch contact with the top side of the first region of the window;

a Flexible Printed Circuit Board (FPCB) comprising a connection portion and a sensor, wherein the connection portion is configured to electrically connect a controller with the touch sheet, and wherein the sensor is located to generally correspond to at least a portion of the second region of the window such that the sensor is configured to detect user input via contact received at the top side of the window at the area that generally corresponds with the input area of the second region.

15. The interface of claim 14, wherein the second region extends from the first region.

16. The interface of claim 14, wherein at least a portion of the FPCB overlaps the second region.

17. The interface of claim 14, further comprising a touch key located in the input area and adapted to receive a touch input from a user and wherein the FPCB comprises a touch sensor adapted to sense the touch input received via the touch key.

18. The interface of claim 14, wherein:

the touch sheet comprises connection lines and the FPCB comprises connection wires; and the connection lines of the touch sheet are connected to the connection wires of the FPCB in the portion of the second region between the input area and the first region.

19. The interface of claim 14, wherein the input area of the second region comprises a plurality of discrete inputs; and wherein the sensor comprises a plurality of sensor inputs which respectively correspond with the plurality of discrete inputs.

20. The interface of claim 19, wherein each of the plurality of discrete inputs comprises a push key.

21. The interface of claim 19, wherein each of the plurality of discrete inputs comprises a mechanical push button.

22. The interface of claim 14, wherein the window is shaped to define a first aperture, wherein the first aperture is located to cooperate with an underlying speaker to facilitate audio transmission via the first aperture.

23. The interface of claim 14, wherein the window further comprises a third region which is located between the first region of the window and the second region of the window, and wherein the connection portion of the FPCB is generally located under the window and at a location that is within a boundary defined by the third region.

24. The interface of claim 14, wherein the connection portion and the sensor are located on a same side of the FPCB.

* * * * *